(12) United States Patent
Shahsavari et al.

(10) Patent No.: US 10,730,802 B2
(45) Date of Patent: Aug. 4, 2020

(54) HEXAGONAL BORON NITRIDE/CEMENT/POLYMER COMPOSITES AND METHODS OF SYNTHESIS

(71) Applicant: C-CRETE TECHNOLOGIES, LLC, Stafford, TX (US)

(72) Inventors: Rouzbeh Shahsavari, Houston, TX (US); Mahesh Bhatt, Stafford, TX (US)

(73) Assignee: C-Crete Technologies, LLC, Stafford, TX (US)

( * ) Notice: Subject to any disclaimer, the term of this patent is extended or adjusted under 35 U.S.C. 154(b) by 0 days.

(21) Appl. No.: 16/056,285

(22) Filed: Aug. 6, 2018

(65) Prior Publication Data

US 2019/0039958 A1 Feb. 7, 2019

Related U.S. Application Data

(60) Provisional application No. 62/541,417, filed on Aug. 4, 2017.

(51) Int. Cl.
*C04B 41/00* (2006.01)
*C04B 35/622* (2006.01)
(Continued)

(52) U.S. Cl.
CPC .......... *C04B 35/6229* (2013.01); *C04B 28/02* (2013.01); *C04B 41/009* (2013.01); *C04B 41/5079* (2013.01); *C04B 41/65* (2013.01); *C04B 35/63408* (2013.01); *C04B 35/63424* (2013.01); *C04B 35/63432* (2013.01); *C04B 35/63456* (2013.01); *C04B 2111/00482* (2013.01); *C04B 2237/361* (2013.01)

(58) Field of Classification Search
CPC .......... C04B 35/6229; C04B 2237/361; C04B 2111/00482; C04B 41/65; C04B 41/5079; C04B 41/009; C04B 28/02
See application file for complete search history.

(56) References Cited

U.S. PATENT DOCUMENTS 8,303,922 B2 * 11/2012 Lin ...................... C01B 21/0687
204/157.4
2018/0272423 A1 * 9/2018 Hu ........................ B22F 1/0014

FOREIGN PATENT DOCUMENTS

WO    WO-2017059029 A1 * 4/2017 ............ B22F 1/0014

OTHER PUBLICATIONS

Weng et al. Functionalized hexagonal boron nitride nanomaterials: emerging properties and applications. Chem. Soc. Rev., 2016, 45, 3989-4012.*

* cited by examiner

*Primary Examiner* — Noah S Wiese
(74) *Attorney, Agent, or Firm* — Gregory L. Porter; Hunton Andrews Kurth LLP

(57) ABSTRACT

Hexagonal Boron Nitride (hBN) is a synthetic material that may be used in several applications due to its chemical inertness, thermal stability, and other beneficial properties. hBN composite materials and method for making such composites are described here. In particular composite materials including both functionalized hBN and cement or cementitious materials and methods for making the same are discussed. Such materials may be useful for construction, well cementing (both primary and remedial cementing), nuclear industry, 3D printing of advanced multifunctional composites, and refractory materials.

20 Claims, 8 Drawing Sheets

(51) Int. Cl.
*C04B 28/02* (2006.01)
*C04B 41/50* (2006.01)
*C04B 41/65* (2006.01)
C04B 35/634 (2006.01)
C04B 111/00 (2006.01)

Figure 1A                    Figure 1B

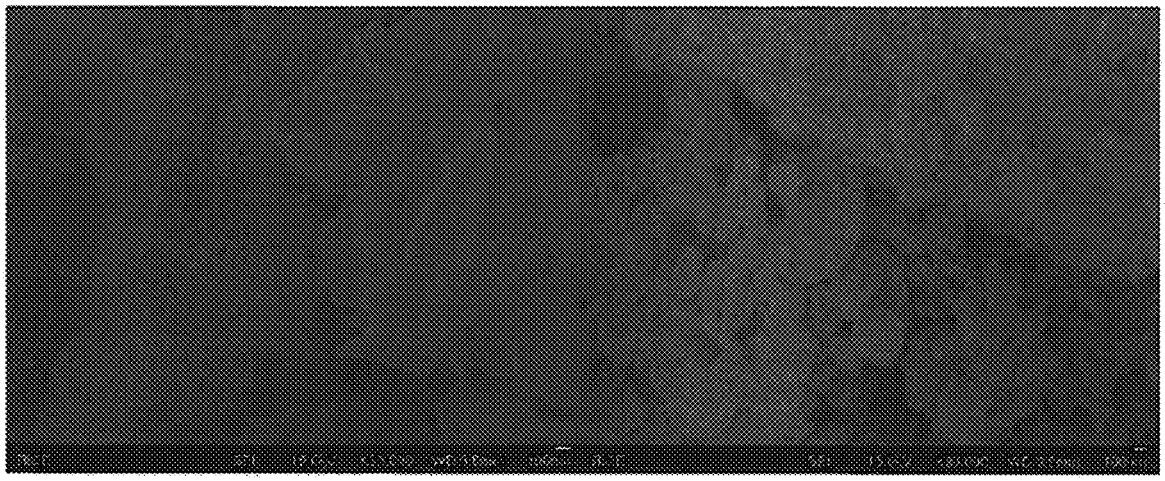
Figure 6A                    Figure 6B
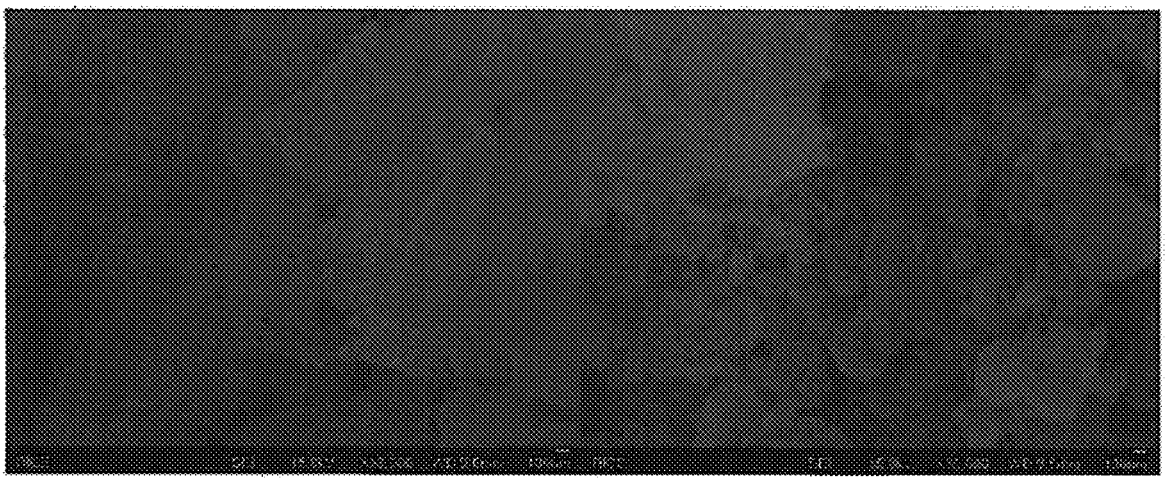
Figure 7A                    Figure 7B

HEXAGONAL BORON NITRIDE/CEMENT/POLYMER COMPOSITES AND METHODS OF SYNTHESIS

CROSS-REFERENCE TO RELATED APPLICATIONS

The present application claims priority from U.S. Application Ser. No. 62/541,417, filed on Aug. 4, 2017, the entire disclosure of which is incorporated herein by reference.

STATEMENT REGARDING FEDERALLY SPONSORED RESEARCH OR DEVELOPMENT

This invention was made in part with Government support. The government may have certain rights in the invention.

FIELD OF INVENTION

The present application is directed to composite material incorporating Hexagonal Boron Nitride (hBN). The present application also encompasses formulations and methods for the preparation of such composites.

BACKGROUND AND SUMMARY OF THE INVENTION

Boron nitride is a synthetic material made from boric acid or boron trioxide. Among its various crystalline forms, its hexagonal allotrope, hexagonal boron nitride (h-BN), can be similar to graphite in structure and layered form but with alternating B and N atoms. h-BN has beneficial thermodynamic (air stable up to 1,000° C.) and chemical stability, exceptional hardness, and great thermal conductivity while being electrically insulating. These properties make hBN suitable for many technological applications. hBN can also exhibit features such as high thermal conductivity and mechanical strength, along with chemical stability. The hydrophobic nature of hBN can be useful in non-wetting surfaces or underwater constructions. hBN can also be used for corrosion-resistant surfaces. Current commercial products of hBN include various thermal management materials such as thermal pads, thermal grease, thermal coatings, and various cosmetics (because of their role as solid lubricants). Furthermore, high neutron absorption cross-section of boron and advantages of multilayered nanostructured materials (i.e., numerous interfaces) to sink radiation, make h-BN a suitable candidate for intercalation in ceramics for nuclear shielding.

Porous cement composites including hBN are described in *Hexagonal Boron Nitride and Graphite Oxide Reinforced* (Advanced Functional Materials, Vol. 25, Issue 45, Pages 5621-5630). This reference describes cement and concrete composites utilizing non-functionalized, non-exfoliated hBN and graphite oxide.

We describe herein a class of multifunctional hexagonal Boron Nitride (hBN)-cement composites utilizing treated, functionalized, and/or exfoliated hBN. Embodiments described herein relate to synthesis, exfoliation, functionalization, hydrolysis, agitating, sonicating, mixing and/or intercalation processes used to develop composites comprising treated hBN that exhibit enhanced properties. In some embodiments, these properties include, but are not limited to strength, toughness, stiffness, ductility, thermal resistance, radiation-resistance, rheology, viscosity, low permeability, durability, and/or acid resistance. In some embodiments, the material may be a protective coating. Enhanced properties may also include compatibility with a wide variety of functional groups, including, but not limited to hydroxyl, amine, and/or thiol groups. In certain embodiments, the disclosed composites include a variety of cementitious materials including but not limited to Portland cement, well cement, calcium aluminate cement, polymers, and/or other binders. In some embodiments, because of the unique properties of treated hexagonal boron nitride, the final composite is resistant to degradation at much higher temperatures than typical cementitious materials and other similar hybrid composites.

Other embodiments disclosed herein relate to construction, transportation, well cementing (both primary and remedial cementing), drilling fluids, nuclear industry applications, radiation rich environments such as outer space, aerospace or medical applications, 3D printing of composites, refractory materials, lubrication, scaffolds for high-temperature combustion sensors, removal of harmful oxyanions such as arsenate, chromate, phosphate from contaminated water and other applications of the disclosed composites.

Certain embodiments relate to composites, mixtures and/or crystal structures comprising hBN, calcium-silicate-hydrate, tobermorite, and/or other products involved in the hydration of cement. These embodiments may further be combined with cement, and/or concrete materials and/or other composites.

In some embodiments, synthesis methods include, but are not limited to solid state reactions and/or solution-based processing of hBN sheets, ribbons, tubes, and/or particles. These methods may be performed at high temperature or at room temperature. The synthesis of treated, exfoliated, hydrolyzed, and/or functionalized boron nitride sheets, ribbons, tubes, and/or particles may be performed first with or without post processing, filtering and/or additional chemical reactions. In some embodiments, the hBN material may then be incorporated into cement or cementitious material, leading to the creation of a new composite material. The functionalization may include, but is not limited to, a variety of functional groups such as hydroxyl, carboxylates, carbonyls, amines, etc. The composite may take advantage of several properties of hBN such as high thermal conductivity and/or thermal stability, low thermal expansion coefficient, high chemical stability, lubricity, radiation tolerance and/or acid tolerance to provide a class of hybrid materials that offers enhanced properties including but not limited to structural and rheological properties and resistance to extreme conditions. In some embodiments, our composite will (1) allow for construction of high-strength, and/or more durable hybrid cement/concrete structures that offer enhanced material properties than conventional cement/concrete, including (but not limited to) applications for construction, well cement (including but not limited to class G and H well cement as well as primary and remedial cementing) and cement used in concrete of nuclear power plants, and/or transportation infrastructure, (2) provide a material that can be used for both general infrastructure and high-temperature applications simultaneously, thus eliminating the need for separate materials, and (3) reduce overall costs by lower replacement expenses (increased durability) and excess material expenses due to (1) and (2).

BRIEF DESCRIPTION OF DRAWINGS

FIG. 6A shows SEM images of a typical hBN (left) and FIG. 6B shows an exfoliated hBN using strong alkali in a mixer (right).

FIG. 7A shows SEM images of a typical hBN (left) and FIG. 7B shows an exfoliated hBN using strong alkali in a rotary mixer (right).

DETAILED DESCRIPTION OF THE INVENTION

Figure 1:
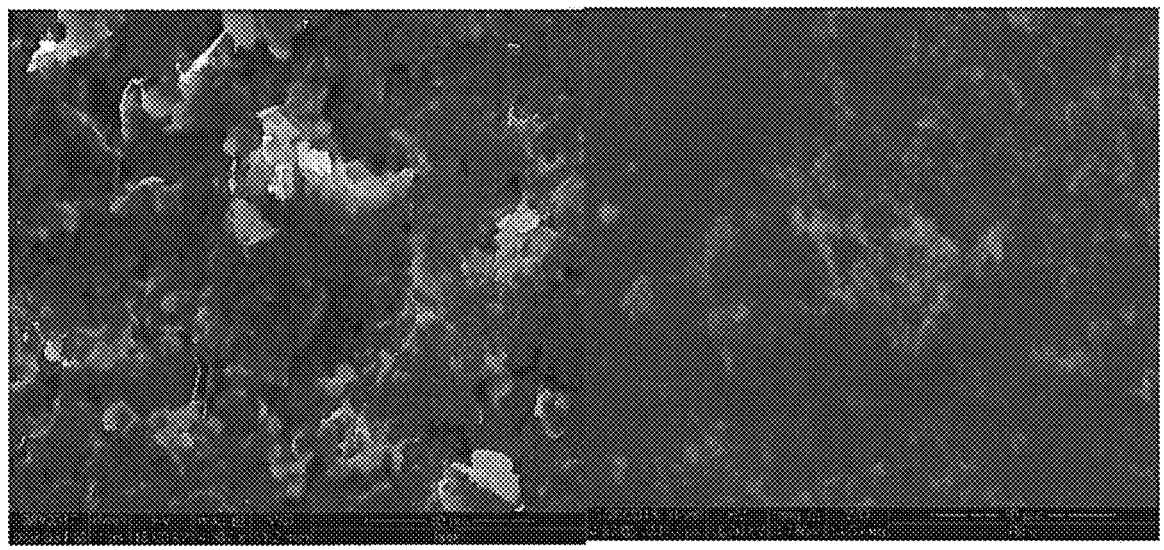
FIG. 1A illustrates an embodiment of hBN before and FIG. 1B shows after the sample is exfoliated.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Note that the word "cement" in this patent refers to all types of cement, including, but not limited to, each and combinations of the followings: types I to IV cement, and well cement (including but not limited to) class G and/or H, Rapid Hardening Cement, Quick setting cement, Calcium Aluminate Cement, Low Heat Cement, Sulphates resisting cement, Blast Furnace Slag Cement, High Alumina Cement, White Cement, Colored cement, Pozzolanic Cement, Air Entraining Cement, fly-ash based cement, bottom ash based cement from incinerated wastes, fly ash based cement from incinerated wastes, cement from whallostonite or psuedowhallostonite or Hydrographic cement and/or other binders that have cementitious properties.

In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

From a mechanical perspective, 2D h-BN sheets, may be an excellent reinforcing materials, similar or superior to or graphene or graphene oxide. Potential factors in fracture toughness are mechanism of anchoring and wrapping the graphene platelet fillers underneath the silica grains, forming a continuous wall of graphene platelet fillers along the grain boundaries. This arrangement can effectively arrests crack propagation in 3D rather than 2D. With relatively similar structures, graphite and BN may also be used to synthesize various forms of carbon nanotubes (CNTs) and boron nitride nanotubes (BNNTs), respectively. In spite of the differences in the electronic properties of CNTs and BNNTs, they possess similar mechanical properties specifically in the Young's modulus, demonstrating their potential applications as mechanical reinforcement. A potential advantage of 2D nanomaterials such as hBN compared to 1D materials such as BNNT is that they possess double surface area for an identical mass. This property leads to extremely high surface area providing excellent capacity for functionalization and binding to the surrounding matrix. In some embodiments, exfoliated single layer hBN may have a surface area of at least about 50 $m^2/g$, or at least about 100 $m^2/g$, or at least about 500 $m^2/g$, or at least about 1,000 $m^2/g$, or at least about 1,500 $m^2/g$, or at least about 2,000 $m^2/g$, or at least about 2,500 $m^2/g$. In some embodiments, exfoliated single layer hBN may have a surface area of less than about 1,000 $m^2/g$, or less than about 1,500 $m^2/g$, or less than about 2,000 $m^2/g$, or less than about 2,500 $m^2/g$. In a particular embodiment, exfoliated single layer hBN has a surface area of about 2,200 $m^2/g$.

Ultrathin hBN sheets may be used to improve the mechanical properties of BN-based polymer composites. In some embodiments a polymer composition comprises at least about 0.01 wt % hBN, or at least about 0.05 wt % hBN, or at least about 0.1 wt % hBN, or at least about 0.3 wt % hBN, or at least about 0.5 wt % hBN, or at least about 0.7 wt % hBN, or at least about 1.0 wt % hBN, or at least about 1.2 wt % hBN, or at least about 1.5 wt % hBN, or at least about 2.0 wt % hBN. In some embodiments a polymer composition comprises at most about 0.3 wt % hBN, or at most about 0.5 wt % hBN, or at most about 0.7 wt % hBN, or at most about 1.0 wt % hBN, or at most about 1.2 wt % hBN, or at most about 1.5 wt % hBN, or at most about 2.0 wt % hBN. The hBN may be in the form of sheets, ribbons, tubes, and/or particles. The polymer may include, but is not limited to, Poly(methyl methacrylate), polyacrylics, polyamides, polyethylenes, polystyrenes, polycarbonates, methacrylics, polyphenols, polypropylene, polyolefins, such as polyolefin plastomers and elastomers, EPDM, polyalkyleneglycols and copolymers of ethylene, epoxy, polyurethane, unsaturated polyester resins or combinations thereof. In a certain embodiment, the addition of about 0.3 wt % hBN nanosheets in Poly(methyl methacrylate) (PMMA) increases the elastic modulus by about 22% and the strength by about 11%.

Infrastructure materials may benefit from the properties of hBN. Concrete, as the most widely used material on Earth, is a brittle material with a strong compression strength but relatively weak tension, flexural and fracture toughness. While reinforcing steel bars can partially overcome these issues, they are not generally able to prevent local cracking and allowing the material to resist high flexural loads. This has encouraged incorporation of several additives into cement paste, which is a known binder in concrete. Some examples include polymer modified cement for enhancing ductility and fiber-reinforced cement for micro reinforcement.

The robust B—N bonding within a BN layer makes BN nanosheets highly thermoconductive. The disclosed nanosheets may have a single layer, two layers, less than five layers, less than 10 layers, less than 50 layers or many layers.

In some embodiments, the disclosed composites have a thermal conductivity of at least about 0.1 W/mK, or at least about 10 W/mK, or at least about 500 W/mK, or at least about 1,000 W/mK, or at least about 1,500 W/mK or at least about 2,000 W/mK. Disclosed embodiments may also be mechanically strong and elastic as well as thermally and chemically stable. Disclosed embodiments may also have low viscosity when in the slurry phase thereby facilitating pumping. Disclosed embodiments may also have low permeability (to liquid and gas) and may be useful in applications related to spills and leaks. Partially ionic B—N bonds, different from pure covalent bonds in graphene, make BN nanosheets an intrinsic electrical insulator with a wide band gap (ca. 5.5 eV) that can be valuable for dielectric applications and deep ultraviolet luminescence. Disclosed embodiments may have beneficial thermal conductivity, heat resistance, corrosion resistance, dielectric applications, deep ultraviolet luminescence, sealing or brazing operation in induction, vacuum and atmosphere furnaces and/or electric insulation properties.

hBN sheets may be used as an additive in various types of matrices. In one embodiment, exfoliated hBN, is mixed and/or intercalated in between calcium-silicate-hydrate (C—S—H) layers and into bulk cement. Without being bound by theory, it is believed that hBN intercalates in between the C—S—H layers as described in *Intercalated Hexagonal Boron Nitride/Silicates as Bilayer Multifunctional Ceramics* (ACS Appl. Mater. Interfaces, 2018, 10 (3), pp 2203-2209), providing reinforcement at the basal plane. The entire disclosure of which is hereby incorporated by reference.

Certain disclosed embodiments include using sonochemical techniques, as an alternative or in addition to conventional chemical methods to obtain hBN. Nanomaterials are effective fillers for the nanocomposites due to their developed surfaces and high aspect ratios. In some embodiments hBN may have nanometer thickness and up to micrometer lateral dimensions. In some embodiments, functionalized and/or exfoliated hBN may have a lateral size of at least about 10 nm, at least about 50 nm, at least about 100 nm, at least about 500 nm, or at least about 1 $\mu$m, or at least about 3 $\mu$m, or at least about 5 or at least about 10 $\mu$m, or at least about 25 $\mu$m, or at least about 50 $\mu$m. In some embodiments, functionalized and/or exfoliated hBN may have a lateral size of less than about 10 nm, less than about 50 nm, less than about 100 nm, less than about 500 nm, or less than about or less than about 3 $\mu$m, or less than about 5 $\mu$m, or less than about 10 $\mu$m, or less than about 25 $\mu$m, or less than about 50 $\mu$m.

In some embodiments, hBN may have an aspect ratio (width to thickness) of at least about 20, or at least about 50, or at least about 100, or at least about 500, or at least about 1,000, or at least about 3,000, or at least about 5,000, or at least 10,000. In some embodiments, hBN may have an aspect ratio (width to thickness) of not more than about 100, or not more than about 500, or not more than about 1,000, or not more than about 3,000, or not more than about 5,000, or not more than 10,000.

In some embodiments, the hBN may have a thickness of less than about 0.3 nm, or less than about 0.5 nm, or less than about 1 nm, or less than about 10 nm, or less than about 50 nm, or less than about 100 nm, or less than about 500 nm, or less than about 1 $\mu$m, or less than about 5 $\mu$m, or less than about 10 $\mu$m, or less than about 15 $\mu$m, or less than about 20 $\mu$m, or less than about 25 $\mu$m.

A method of synthesizing hBN/cement composites leading to cementitious materials with desirable properties is described herein. In certain embodiments, these composites can have properties including, but not limited to mechanical, thermal, rheological, and radiational properties, high durability, resistance to solvents and acids, rapid heat diffusing properties, protective coating, low permeability, resistance to harmful ions, and/or good adherence to metal, ceramic, glass, porcelain, and other surfaces.

Applications

Embodiments may be used in several areas including but not limited to building infrastructures, roads, highways, the ceramic industry, the construction industry, the composite industry, the refractory materials industry, coating industry, purification industry, the nuclear industry, the oil and gas industry, the medial industry, the space industry, combustion industry, and/or other environments that may have extreme conditions. The disclosed composites may allow for more exotic architectural achievements because of the broadening in the range of applications that are available for structural and/or multifunctional materials. In an exemplary embodiment, roads containing disclosed composites may show longer durability and stability without repair. In an another embodiment, well cement containing disclosed composites may show better rheology, low permeability (to gas/liquid leakage), better resistance to high temperature, high pressure and/or corrosive conditions of downhole environments. In another embodiment, hBN/cement composites can be used for 3D printing of cementitious materials or other multifunctional composites. In still another embodiment, composites comprising hBN and polymers (including but not limited to photopolymers, epoxies, and/or polymers with chemical functionality capable of engaging the hBN with hydroxyl, carboxylate, amine and any carbonyl groups) may be used to create multifunctional composites. In another embodiment, composites may comprise hBN, polymer, and/or porous calcium-silicates or combinations thereof and may be used to create a wide array of multifunctional composites.

Certain embodiments comprise the synthesis, treatment, functionalization, hydrolysis, tailoring, agitating, sonicating, mixing and/or intercalation of sub-nano size, nano-size, and/or micron size hBN in C—S—H and bulk cement.

In some embodiments, exfoliated BN nanosheets may be used as nano-scale fillers with ultra-high surface area capable of efficiently binding to cement composites.

It will be understood that factors such as starting materials, pH, processing chemicals, temperature, time, sonication power and time, centrifuge speed and time, mixing speed and time, and/or the amount and type of solvent and/or additives, and/or curing time and conditions may be adjusted in order to control the exfoliation, functionalization, incorporation, mixing and/or intercalation of hBN and/or composite materials.

Materials and Synthesis

An exemplary process for the synthesis of hybrid cement composite may involve the following:

Synthesized and/or commercially available hBN sheets, ribbons, tubes, and/or particles are thoroughly mixed with distilled water, deionized water, high-performance liquid chromatography (HPLC) water, isopropyl alcohol (IPA), methanol, ethanol, N-Methyl pyrrolidine, pyridine, ether, amines, amides or a mixture thereof at a concentration of hBN ranging from about 0.1 mg/ml to about 1 g/ml. In some embodiments, polyethylene glycol (PEG) may be added to the mixture. The amount of additional PEG may be in the range of (hBN to PEG) from about 0.1 mg/ml, about 1 mg/ml, about 10 mg/ml to about 100 mg/ml, or about 1 g/ml.

This hBN mixture is then bath and/or tip sonicated at a specific power of up to about 700 W for between about 2-24 hours at a temperature of about 20° C. to about 90° C. This process may have two purposes: 1) exfoliation and/or separation of individual hBN sheets, ribbons, tubes, and/or particles, and/or 2) functionalization of individual hBN sheets, ribbons, tubes, and/or particles for improved water-suspensibility and composite adhesion.

The hBN mixture may then be 1) dried in a evaporation chamber, 2) dried and further hydrolyzed in a heating chamber, or 3) mixed with cement to form a pre-mold mixture. In some embodiments, the mixture is dried in an evaporation chamber at about 110° C. for about 12 hours. In some embodiments, the dried mixture is further hydrolyzed in a heating chamber at a temperature of between about 500 to about 1,100° C. for between about 1 to about 24 hours under a flow of nitrogen, air, and/or water steam. The mixture may then be dried and/or cooled.

The dried and cooled sample may then be added to cement and/or calcium silicate hydrate (C—S—H) in the range of about 0.05-40 wt % hBN and mixed. In some embodiments, the weight percent of hBN is at least about 0.1 wt %, or at least about 0.15 wt %, or at least about 0.3 wt %, or at least about 0.5 wt %, or at least about 1 wt %, or at least about 3 wt %, or at least about 5 wt %, or at least about 10 wt %, or at least about 20 wt %, or at least about 30 wt %, or at least about 35 wt %, or at least about 40 wt %. In some embodiments, the weight percent of hBN is less than about 0.15 wt %, or less than about 0.3 wt %, or less than about 0.5 wt %, or less than about 1 wt %, or less than about 3 wt %, or less than about 5 wt %, or less than about 10 wt %, or less than about 20 wt %, or less than about 30 wt %, or less than about 35 wt %, or less than about 40 wt %.

While the examples herein are presented in terms of cement, it will be understood that C—S—H may be utilized additionally or alternatively. The cement mixture may be mixed in any manner including, but not limited to using with a rotating ball mill, a rotary mixer, a conventional mixer, a screw mixer, an extruder, a shear mixer, a drill, and/or manually shaken. In some embodiments, the cement mixture may be mixed for at least about 30 seconds, or at least about 1 minute, or at least about 5 minutes, or at least about 30 minutes, or at least about 1 hour, or at least about 3 hours, or at least about 8 hours, or at least about 24 hours, or at least about 72 hours, or at least about 100 hours, or at least about 300 hours, or at least about 600 hours, or at least about 720 hours.

This sample is then mixed with water to achieve a desired hBN-cement composite, e.g., a final water:cement ratio of between about 0.25 and about 0.50. In some embodiments, the treatment, exfoliation, hydrolysis, and/or functionalization of the hBN allows for the intercalation of hBN into the cement or C—S—H. This may result in the hBN layer providing reinforcement and/or heat delocalization to the surrounding cement and/or C—S—H.

The resulting mixtures may be mechanically stirred and/or mixed for between about 0.5 to about 30 minutes and poured into a mold. In some embodiments, the mixture may be agitated and/or combined with sand and gravel and prepared according to industry testing standards.

In some embodiments, the samples are cured for less than about 72 hours, between about 72 to about 672 hours, or greater than about 672 hours at a desired or ambient temperature. The samples may then be exposed to test temperatures ranging from less than about 20° C. to between about 20° C. to about 700° C., or greater than about 700° C. and taken for further characterization and testing.

Characterization & Testing

The composite material may be characterized under scanning electron microscopy (SEM), transmission electron microscopy (TEM), X-ray Diffraction (XRD), selected-area electron diffraction (SAED), and/or other techniques to provide insight into the composite structure, morphology, and/or bonding. FIGS. 1A & 1B show a SEM micrograph showing an example of neat hBN and chemically exfoliated hBN.

In some embodiments, characterization has shown an enhanced heat resilience of the hBN composites compared to pure cement.

In some embodiments, at room temperature (20° C.), a composite of 0.1 wt % functionalized hBN shows at least 60% increase in strength and 30% increase in toughness compared to pure cement. These differences may be reduced at higher temperatures but remain present as substantial improvements. In some embodiments, at the temperature of 500° C., a composite of 0.1 wt % functionalized hBN shows at least 35% increase in strength and 10% increase in toughness compared to pure cement.

Potential factors which may result in desirable characteristics include, but are not limited to sonication or mixing time and power, the type of solvent, hBN concentration, hBN type, size and/or thickness, water:cement ratio, and/or curing time and conditions.

Some known methods of exfoliating and/or functionalizing hBN require the use of carcinogenic materials. Multiple exemplary embodiments of methods for exfoliating and/or functionalizing hBN without the use of carcinogenic materials are described below.

Samples of hBN were exfoliated and or functionalized by: (1) sonicating in IPA or Dimethylformamide (DMF) or as well as a combination of the two solvents; (2) thermally treating at 1,000° C.; and/or (3) alkali treating using sodium hydroxide, and/or ammonium hydroxide.

An alkaline solution of water or solvent, including but not limited to N-methyl pyrrolidine, pyridine, or Piranha solution, may be used to exfoliate and functionalize hBN. A change in pH and hence the strength of solution can be varied by adding oxidants including hydrogen peroxide or other bases including organic amines. The alkali solution of water includes but is not limited to a solution of sodium hydroxide, potassium hydroxide, ammonium hydroxide or combinations thereof with or without the addition of oxidants and/or organic amines.

The exfoliated and/or functionalized hBN samples were tested by FTIR to investigate the presence of hydroxyl groups. The hydroxyl functionalized hBN may act as a lubricant in cement water slurry and also may help to bind cement particles together resulting in improved properties.

EXAMPLE 1A—Chemical Treatment

First, NaOH was dissolved in 500-2000 mL of water to make a saturated solution followed by the addition of about 2-10 v % of $NH_4OH$. Next 10-50 g of as purchased hBN was added into the basic solution and stirred for 10-20 hours. The water was evaporated and the product was dispersed in water again. The dried materials were tested by FTIR. FIG. 1B shows that the chemically treated hBN were exfoliated and reduced in lateral size. As an example, the chemical treatment method reduces 10 μm hBN down to as low as 1 μm.

EXAMPLE 1B—Chemical Treatment and Centrifuge

In another exemplary embodiment, the chemically treated hBN of Example 1a was suspended in water and centrifuged for 3-20 minutes at a speed of 1,000-6,000 rpm. The supernatant was separated and then dried. FTIR characterizations showed that both of the chemically treated hBN samples are functionalized. Even in the bulk sample, a weak hydroxyl peak is present at ~3200 $cm^{-1}$. The centrifuged hBN showed a more clear peak of —OH. The FTIR results confirm that the described chemical treatment results in effective exfoliation and hydroxyl functionalization.

EXAMPLE 2—Functionalized HBN and the Compressive Strength of Cement Composites Portland cement and functionalized hBN (bulk) from Example 1a were mixed and ball milled for 10-20 hours. The amount of hBN added was varied from 0.1 to 1.2 weight percent to the cement. Water was added to the hBN-cement mixture. A slurry was made by keeping the water to cement ratio at 0.40:1 by weight. Next the slurry was casted on 2" cube molds. The cubes were taken out of the molds after 24 hours and placed in water. The mechanical strength of the cubes were measured after 7, 14, and 28 days.

Figure 2:
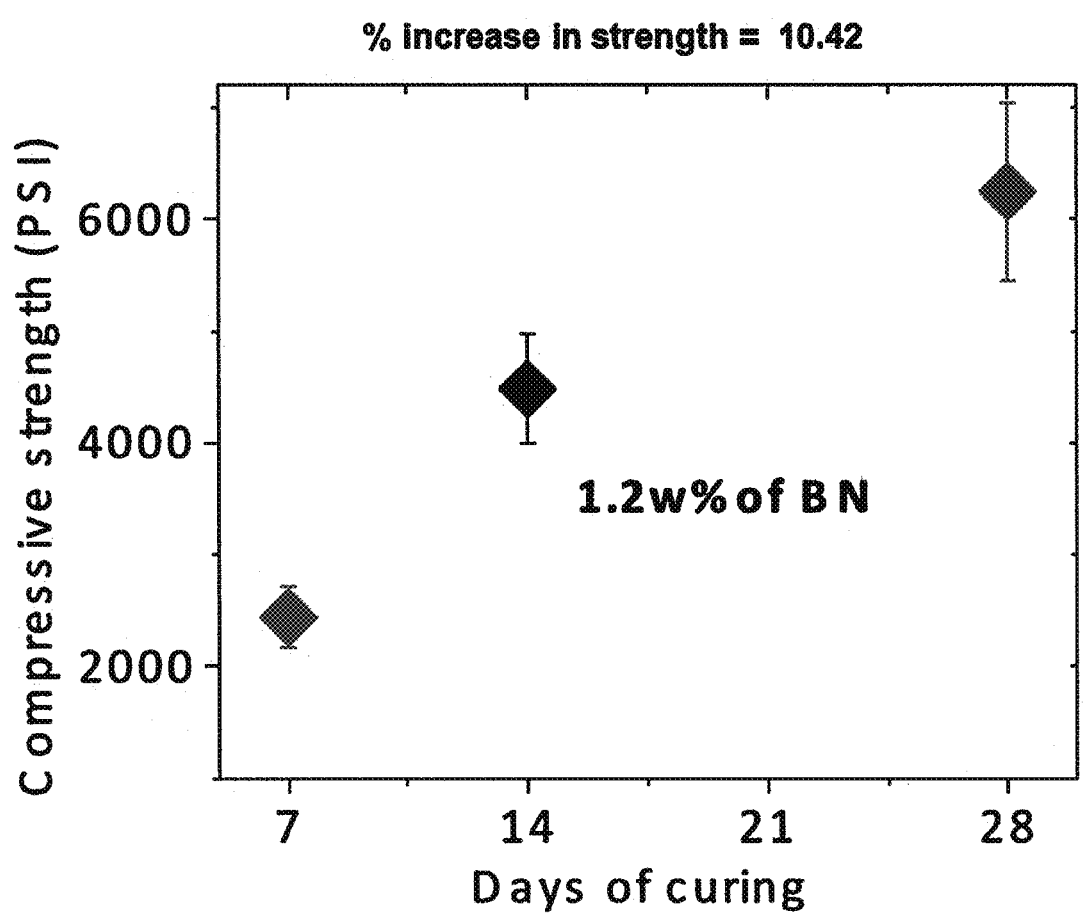
FIG. 2 depicts a plot of compressive strength vs. curing time obtained from a composite cement sample comprising 1.2 w % hBN.

FIG. 2 shows that functionalized hBN has a significant effect on the compressive strength of the cement cubes. The addition of 1.2 wt % functionalized hBN increased the compressive strength of the composite cube by 10.42%.

EXAMPLE 3—Centrifuged HBN and Cement Composite

Figure 3:
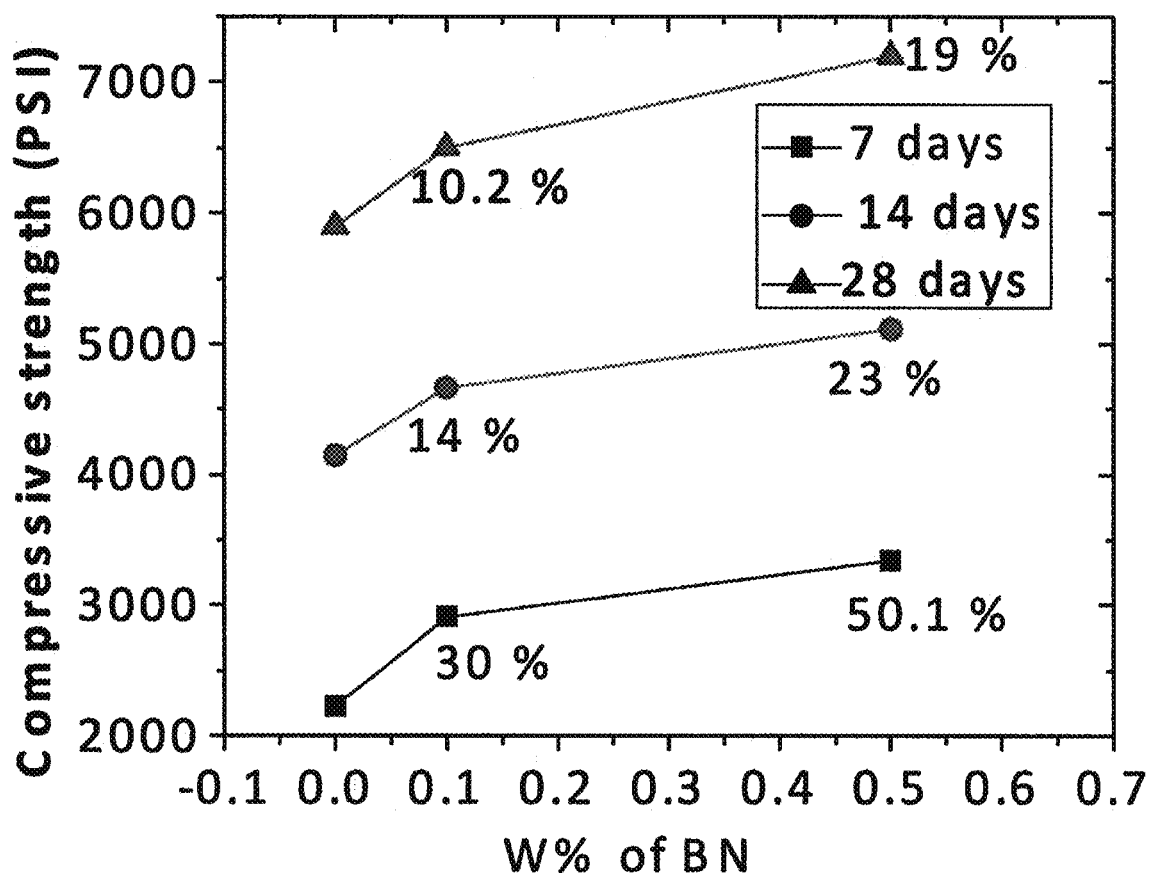
FIG. 3 depicts a plot showing weight percent of hBN vs. compressive strength.
Figures 4A, 4B:
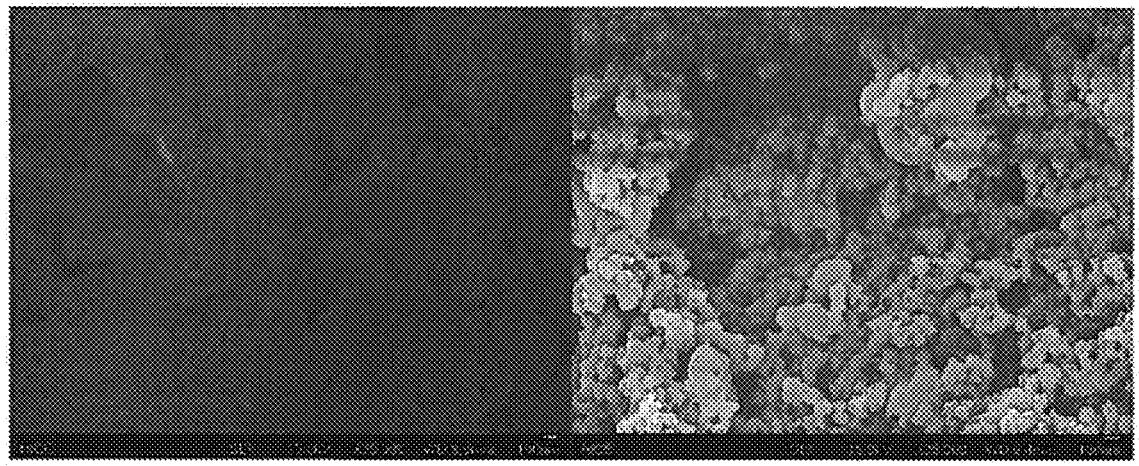
FIG. 4A shows SEM images of a typical hBN (left) and FIG. 4B shows an exfoliated hBN using strong alkali in a shear mixer (right).
Figures 5A, 5B:
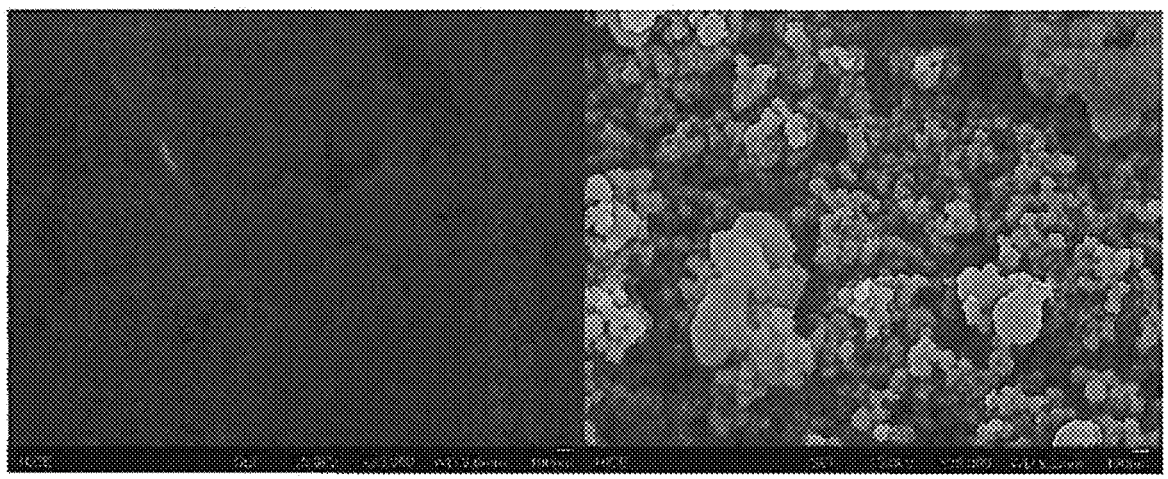
FIG. 5A shows SEM images of a typical hBN (left) and FIG. 5B shows an exfoliated hBN using strong alkali in a rotary mixer (right).
Figures 8A, 8B:
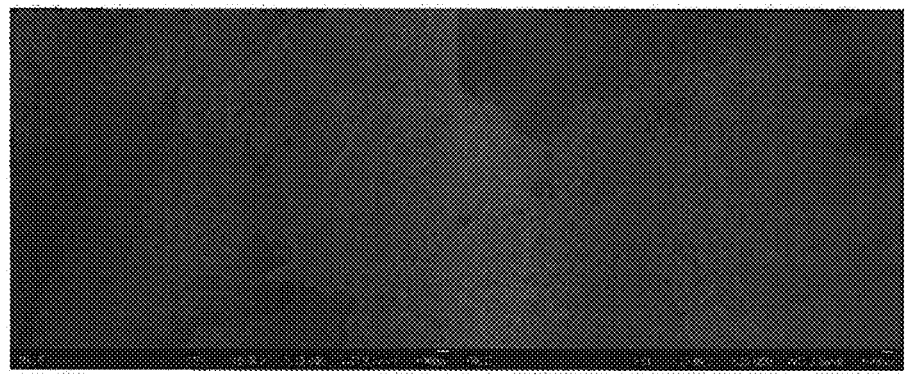
FIG. 8A shows SEM images of a typical hBN (left) and FIG. 8B shows an exfoliated hBN using NMP in a mixer (right).

The functionalized hBN (supernatant) from Example 1b was mixed with Portland cement at 0.1 and 0.5 wt % hBN. Water was added to the hBN-cement mixture at a water to cement ratio 0.40:1 by weight and slurry was casted on 2" cube molds as described above. FIG. 3 shows the compressive strength of pure cement, 0.1 wt % hBN composite, and 0.5 wt % hBN composite after 7, 14, and 28 days.

EXAMPLE 4—Effects of Ball Milling Compared to Mixing HBN Composites 2-10 vol % of ammonia solution was added into the saturated solution of sodium hydroxide followed by the addition of 5-20 v % of $H_2O_2$. 1-4 g of hBN was added into the basic solution and stirred for 10-20 hours. Next, the water was evaporated and the product was dispersed in water again. The product was washed with excess of water and dried, creating exfoliated and functionalized hBN. The solution prepared in this example was made by mixing a 1-5M solution of Sodium hydroxide, 2-6 v % of ammonia and 5-20 v % of Hydrogen peroxide, however in other embodiments, the results may vary if the concentration of any of the solution components are changed or the pH is changed. Additionally, the results may vary if other bases like amines and/or oxidants like hydrogen peroxide, chlorate, bromine, iodine and/or combinations thereof are added. Merely as an example, if the sodium hydroxide used is saturated, the concentration of ammonia and/or Hydrogen peroxide may be varied and the alkali strength may be increased. Using such a solution, higher exfoliation and functionalization may be expected.

i. Ball Milled Sample: A calculated amount of the alkali functionalized hBN was added to cement to create cement mixtures with 0.1 wt %, 0.15 wt %, 0.25 wt %, 1 wt %, 3 wt %, and 5 wt % hBN. These samples were each ball milled for 10-20 hours. Next the cement/hBN mixtures were mixed in water with a water to cement ratio of 0.40:1. The slurry was casted on 2" cube molds. The cubes were taken out off of the molds after 24 hours and placed in water and the mechanical strength was measured.

ii. Mixed in Water Sample: A calculated amount of the alkali functionalized hBN was added to cement to create mixtures of 0.1 wt %, 0.15 wt %, 0.25 wt %, 1 wt %, 3 wt %, and 5 wt % hBN. Water was added to these samples and the samples were each mixed with a mixture at a speed of 3,000-6,000 rpm for 2-10 hours. Next the cement/hBN suspensions were mixed in water with a water to cement ratio of 0.40:1. The slurry was casted on 2" cube molds and tested as described above.

The compressive strength of the cubes created by i) ball milling the alkali treated hBN with cement and ii) mixing the alkali treated hBN in water using a mixer was measured. The hBN-cement composites created using both types of mixing increased in compressive strength. The compressive strength of the composite increased as the weigh percent of hBN was increased, and eventually tapered off.

EXAMPLE 5—Exfoliation and Functionalization of HBN Using Ball Milling, Mechanical Mixing in Water, Shear Mixing in Water, or Shear Mixing in Alkali First, 1-5 v % of ammonia was added to a saturated solution of sodium hydroxide followed by the addition of 5-20 v % of H2O2. Next, 1-5 g of hBN was added into the basic solution and stirred for 10-20 hours. The water was evaporated and the product was washed with an excess of water and dried, creating hydroxyl functionalized hBN.

i. Ball Milled Sample:

A calculated amount of the alkali functionalized hBN was added to cement to create mixtures of 0.1 wt %, 0.15 wt %, 0.25 wt %, 1 wt %, 3 wt %, and 5 wt % hBN. These samples were each ball milled for 10-20 hours. Next the cement/hBN composites were mixed in water with a water to cement ratio of 0.40:1. The slurry was casted on 2" cube molds. The cubes were taken out off of the molds after 24 hours and placed in water and the mechanical strength was measured. For each weight percent, the cubes were casted and tested for mechanical strength and compared to a sample cube of cement without hBN. As an example, the sample with 0.15 wt % hBN showed 30% increase in strength compared to the control sample.

ii. Mixed in Water Sample:

A calculated amount of the alkali functionalized hBN was added to cement to create mixtures of 0.1 wt %, 0.15 wt %, 0.25 wt %, 1 wt %, 3 wt %, and 5 wt % hBN. Water was added to these samples and the samples were each mixed with a mixture at a speed of 3,000-10,000 rpm for 10 minutes to 10 hours. Next the cement/hBN suspensions were mixed in water with a water to cement ratio of 0.40:1. The slurry was casted on 2" cube molds and tested as described above. As an example, the sample with 0.15 wt % hBN showed a 35% increase in strength compared to the control sample.

iii. Shear Mixed in Water Sample:

A calculated amount of the alkali functionalized hBN was added to cement to create mixtures of 0.1 wt %, 0.15 wt %, 0.25 wt %, 1 wt %, 3 wt %, and 5 wt % hBN. Water was added and the sample was mixed in a shear mixer at 3,000-10,000 rpm for 10 minutes to 10 hours. Next the cement/hBN suspensions were mixed in water with a water to cement ratio of 0.40:1. The slurry was casted on 2" cube molds and tested as described above. As an example, the sample with 0.05 wt % hBN showed 34% increase in strength compared to the control sample.

iv. Shear Mixed in alkali Sample:

A calculated amount of the alkali functionalized hBN was added to cement to create mixtures of 0.1 wt %, 0.15 wt %, 0.25 wt %, 1 wt %, 3 wt %, and 5 wt % hBN. A saturated sodium hydroxide solution was added and the sample was mixed in a shear mixer at 3,000-10,000 rpm for 10 minutes to 10 hours. Next the cement/hBN suspensions were mixed in water with a water to cement ratio of 0.40:1. The slurry was casted on 2" cube molds and tested as described above. As an example, the sample with 0.05 wt % hBN showed 32% increase in strength compared to the control sample.

Certain disclosed embodiments comprising functionalized hBN and cement have an increased compression strength of at least about 5%, at least about 10%, at least about 15%, at least about 20%, at least about 25%, at least about 35%, at least about 50%, at least about 75%, at least about 85%, at least about 100%, or at least about 150%, over similar materials with either unfunctionalized hBN or no hBN. Some embodiments comprising functionalized hBN and cement have an increased compression strength of not more than about 5%, not more than about 10%, not more than about 15%, not more than about 20%, not more than about 25%, not more than about 35%, not more than about 50%, not more than about 75%, not more than about 85%, not more than about 100%, or not more than about 150%, compared to similar materials with either unfunctionalized hBN or no hBN.

EXAMPLE 6—HBN Cement using Rotary and Shear Mixer

Multiple samples of hBN of 15 um and 100 nm were mixed in alkali, sodium cholate, PEG-NaOH, or N-Methyl-2-pyrrolidone (NMP), using either a rotary mixer or shear mixer. The rotary mixer was used for 10 minutes to 10 hours at a speed of 3,000-10,000 RPM. The shear mixer was used for 10 minutes to 10 hours at a speed of 3,000-10,000 RPM. The products were washed with water, filtered and mixed again using a rotary mixer with a calculated amount of water before mixing with cement to create composites with 0.05 wt %, 0.1 wt %, 0.25 wt %, 1 wt %, 3 wt %, and 5 wt % hBN. The slurry was casted on 2" cube molds. The cubes were taken out off of the molds after 24 hours and the mechanical strength was measured. The samples mixed using alkali solution in a shear mixer showed beneficial strength increases. FIGS. 4A, 4B, 5A, 5B, 6A, 6B, 7a, 7B, 8A and 8B depict SEM images of the multiple samples studied in example 6 before and after exfoliation.

EXAMPLE 7—Molten Hydroxide Treated HBN

At a high temperature alkali metal hydroxides like potassium hydroxide, sodium hydroxides may be used to exfoliate hBN. The extent of exfoliation and functionalization was monitored using sodium hydroxide, potassium hydroxide and combinations thereof. In an experiment, 5-30 grams of sodium hydroxide was ground and 5-20 grams of hBN powder was added. The mixture was heated to between 200-600° C. for between 1-10 hours. The product was taken out and washed with ethanol.

i) Calculated amounts of exfoliated hBN from the molten hydroxide method was added into water to cast 2" cement cubes.

ii) 4-20 g of hBN from the molten hydroxide method were mixed in 200-1,500 mL of water and mixed thoroughly using a rotary mixer at the speed of 3,000-10,000 rpm for 10 minutes to 10 hours. The mixture was then transferred into centrifuge tubes and centrifuged at the speed of 2,000-8,000 rpm for 10 minutes to 10 hours. The supernatant was dried and used for further application. Calculated amounts of obtained hBN and water were poured into the rotary mixer and mixed for 10 minutes to 10 hours at the speed of 2,000-8,000 rpm before mixing with cement.

Figures 9A, 9B:
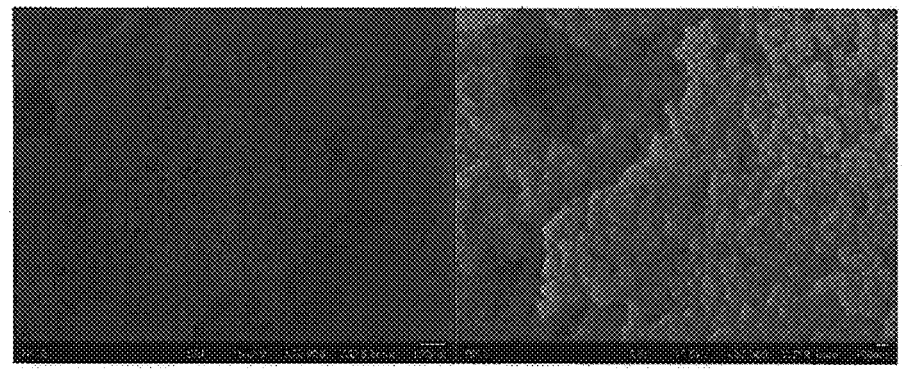
FIG. 9A shows SEM images of a typical hBN (left) and FIG. 9B shows an exfoliated hBN using a molten hydroxide method followed by centrifuge.

FIGS. 9A and 9B show SEM images of the hBN sample before and after being exfoliated using molten hydroxide followed by centrifuge. We measured the compressive strength of hBN-cement 2" cubes created using bulk and centrifuged molten hydroxide exfoliated hBN. As an example, the sample with 0.05 wt % hBN showed greater than a 50% increase in strength compared to the control sample.

EXAMPLE 8—Resistivity and Mechanical Strength of HBN/Concrete Composites

Concrete cylinders with a height of 8" and diameter of 4" were casted using hBN as a filler. First, Alkali treated hBN from example 7 was mixed in a calculated amount of water using a rotary mixer at the speed of 2,000-8,000 rpm for 10 minutes to 10 hours. Next, the hBN was slurry mixed in concrete by keeping water to cement ratio 0.50:1. The concrete was made using cement:sand:gravel in a ratio of 1:2:3. The slurry was casted in molds and which were taken off after 48 hours. The cylinders were kept in the water for next 26 days and tested for resistivity using a Resipod durability tester. The same cylinders were also tested for the mechanical strength. As an example, the sample with 0.1 wt % hBN showed greater than 40% increase in bulk resistivity and greater than 30% increase in surface resistivity compared to the control sample. Additionally, the strength of this sample was increased more than 35% compared to the control sample.

EXAMPLE 9—Intercalated HBN/Cement

Synthesis of composite of C—S—H and hBN: 0.02-1 g BN was suspended in 4-40 mL carbon dioxide-free deionized water and sonicated for 2-4 h in sonication bath. A 2.0 mmol quantity of reagent-grade Na2SiO3.5H2O was dissolved in 2 ml of carbon dioxide-free deionized water to which was added the BN solution. The mixture was sonicated for 30 minutes. Then, 3.0 mmol of reagent-grade Ca(NO3).4H2O was dissolved in 4 ml of carbon dioxide-free deionized water and was added to the solution of BN and Na2SiO3.5H2 drop-wise. Sonication was continued for 2-4 hours. The C—S—H precipitate was then centrifuged at 2,000-10,000 rpm for 5-50 min, washed with water, and dried under vacuum for 48-72 hours. To generate a BN free control sample, Na2SiO3.5H2 was dissolved in 6 mL carbon dioxide-free deionized water. It will be understood that the above synthesis can be performed with any of the exfoliation, and/or functionalization and/or mixing and cements embodiments described herein.

Figures 10A, 10B, 10C, 10D, 10E, 10F:
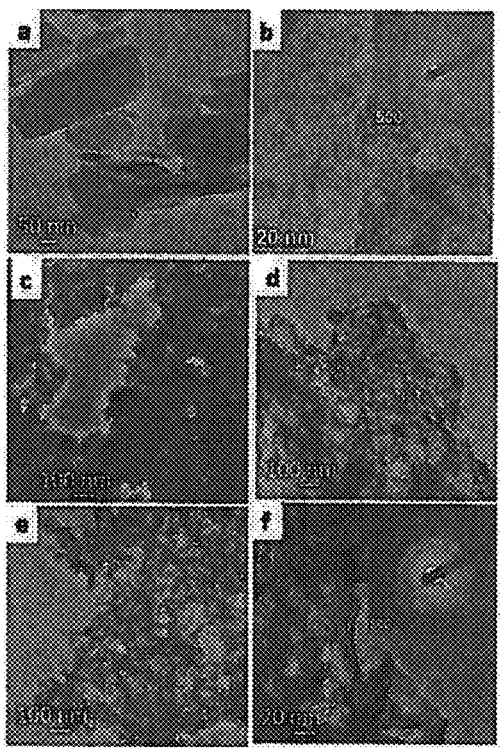
FIG. 10a depicts a representative TEM image of exfoliated hBN.
FIG. 10b depicts a representative TEM image of ultra-thin exfoliated hBN sheets (1-5 atomic layers).
FIG. 10c depicts a representative TEM image of exfoliated hBN.
FIG. 10d depicts a representative TEM image of the hBN/C—S—H(I).
FIGS. 10e-f depict representative TEM images of the hBN/C—S—H(II) at two different scales.
Figure 10G:
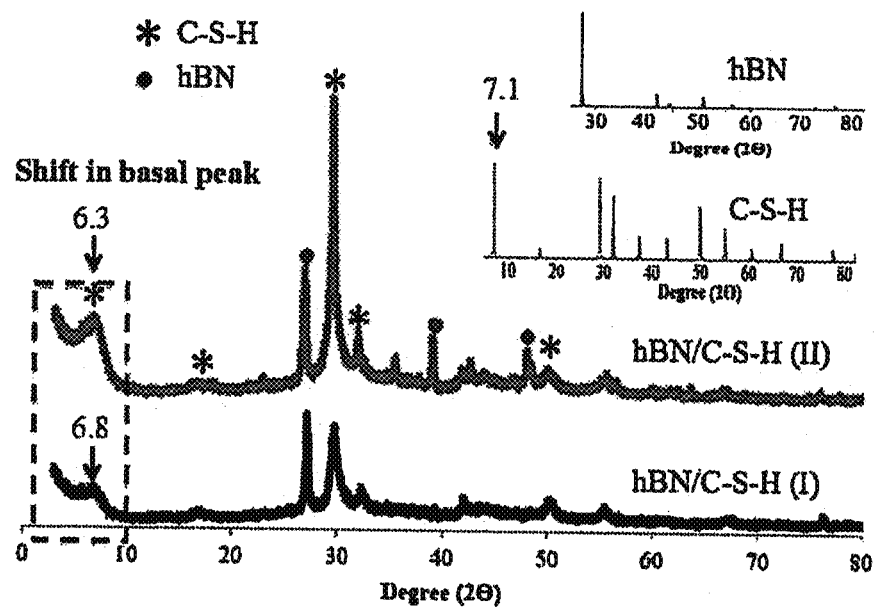
FIG. 10g depicts a representative XRD spectra of hBN/C—S—H and control samples.
Figure 10H:
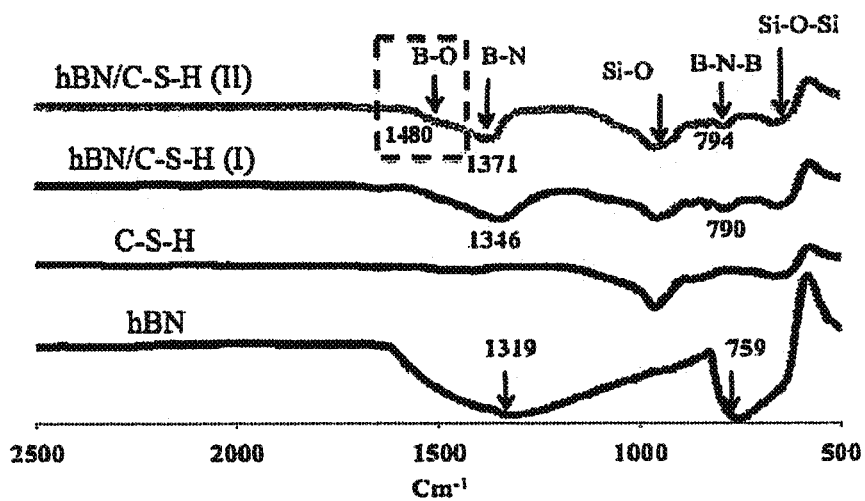
FIG. 10h depicts a representative FTIR spectra of the hBN/C—S—H and control samples.

FIGS. 10a-f show TEM images of the products and FIGS. 10g-h demonstrate the results of the (X-ray Diffraction) XRD and Fourier Transformed Infrared (FTIR) characterizations before and after intercalation. Depending on the extent of the hBN exfoliation, the hybrid hBN/C—S—H products may have different characteristics. The notations hBN/C—S—H(I) and hBN/C—S—H(II) refer to the products that used hBN sheets as procured (FIG. 10a) and exfoliated hBN (FIG. 10b), respectively. The insets in FIGS. 10b and 10f show the Selected Area Electron Diffraction patterns, indicating the crystallinity of hBN in both pure hBN and hBN/C—S—H. The inset in FIG. 10f shows SAED diffraction, confirming the presence of hBN in the composite.

The intercalation of other material phases in C—S—H increases the interlayer spacing, in comparison with the spacing of the host, leading to a shift of the XRD diffraction peak towards lower angle values. Comparing the basal peaks of the XRD spectra with the control C—S—H (FIG. 10g), it is found that in both hBN/C—S—H(I) and hBN/C—S—H(II), the 2θ shifts to lower values, indicating intercalation of the exfoliated hBN in C—S—H. For instance, the 2θ angle shifts from ~7.1° in pure C—S—H to ~6.3° in hBN/C—S—H(II), corresponding to an increase of basal spacing. Note that this new peak is different than those of pure hBN that occur at about 28° and larger (see inset in FIG. 10g). Furthermore, the sharper basal peak of the hBN/C—S—H(II) compared to that of hBN/C—S—H(I) suggests that the use of exfoliated and thinner hBN results in more ordered and homogenous structures.

Further evidence of intercalation can be obtained from FTIR spectra in FIG. 10h. In view of the characteristic peaks of control C—S—H at 960 and 667 $cm^{-1}$ corresponding respectively to Si—O and Si—O—Si stretching and those of hBN at 759 and 1319 $cm^{-1}$ corresponding to B—N—B and B—N stretching, FIG. 10h shows that these four peaks are also present in the intercalated hBN/C—S—H products but shifted to the higher wavelengths ($cm^1$). This indicates the formation of a hybrid hBN and C—S—H composite. In the hBN/C—S—H (II) the shifts are larger compared to hBN/C—S—H (I), suggesting more interaction (i.e. intercalation) with the host material. Another interesting observation in hBN/C—S—H (II) was the appearance of a blunted new peak on the shoulder of B—N vibration, corresponding to B—O stretching at 1480 $cm^{-1}$. Although broadened, this peak suggests a new bonding between the oxygen of C—S—H and boron atoms of hBN, which confirms the formation of a hBN/C—S—H composite, and was verified by our ab-initio calculations, described in *Intercalated Hexagonal Boron Nitride/Silicates as Bilayer Multifunctional Ceramics* (ACS Appl. Mater. Interfaces, 2018, 10 (3), pp 2203-2209).

EXAMPLE 10—Mechanical Testing of BN/C—S—H Composite Before and After Radiation Exposure Synthesis: First, the hBN nano-powder was extensively sonicated in isopropyl alcohol at room temperature for about 2-6 hours. Next, the solution was centrifuged for 10-60 min at 2,000-10,000 rpm. The whitish precipitate was collected and vacuum-dried. The hBN was suspended in 2-20 mL carbon dioxide-free deionized water and sonicated for 2-8 hours in a sonication bath. To create a C—S—H, for example, with a Ca/Si of 2, a 2.0 mmol quantity of reagent-grade Na2SiO3.5H2O was dissolved in 2 ml of carbon dioxide-free deionized water to which the hBN solution was added. The mixture was sonicated for 10-60 minutes. 4.0 mmol of reagent-grade Ca(NO3).4H2O that was dissolved in 4 ml of carbon dioxide-free deionized water was added to the solution of hBN and Na2SiO3.5H2 drop-wise. Sonication was continued for 2 hours. The C—S—H precipitate was then centrifuged at 2,000-10,000 rpm for 10-60 min and dried under vacuum for 48-72 hours. Next, the powder was formed into pellets of about 1 cm is diameter and about 4 mm in thickness to undergo radiation exposure. To produce hBN free samples as a control, Na2SiO3.5H2 was dissolved in 6 mL carbon dioxide-free deionized water. It will be understood that the above synthesis can be performed with any of the exfoliation, and/or functionalization and/or cements, and/or mixing, embodiments described herein.

For radiation exposure, both the hBN/C—S—H composite pellet and control C—S—H pellet were exposed to a beam. In some embodiments, the energy of the proton was 2 MeV under the total fluence of 3.4E+16/$cm^2$. To perform the mechanical testing, nanoindentation testing was used before and after exposure to radiation. By performing over 100 indentation tests, the average hardness (which relates to strength) of the hBN/C—S—H samples before and after radiation exposure was found to be comparable to each other while the control sample exhibited about a 50% reduction in mechanical hardness after radiation exposure. The same trend was observed in the elastic modulus. Furthermore, the surface of the control sample was significantly burnt and destroyed by the beam whereas the surface of the hBN/C—S—H composites was relatively intact. Thus, the hBN/C—S—H composite is able to tolerate the irradiation more efficiently.

EXAMPLE 11—Coating Application and Protection at Extreme Environments

Two ordinary Portland cement (OPC) tablets were created and functionalized hBN/cement composite material was applied to the top surface of one of these tablets as a coating. In some embodiments, the tablets are about 1 cm in diameter and about 4 mm in thickness. In some embodiments, the coating may be about 0.5-1 mm thick, and about 10-20% by weight of functionalized exfoliated hBN. The samples were exposed to radiation. In some embodiments, 2.0 MeV protons and a fluence of $2\times10^{16}$ ions/$cm^2$ were utilized. Then, to compare the effect of the radiation on the OPC substrate, the coating was removed. While the uncoated OPC sample showed cracks caused by the irradiation, the OPC sample which had been initially coated did not show any cracks. As an example, compressive mechanical testing on the post-irradiation samples (after coating removal) with 15% hBN showed that the uncoated sample has about 50% less mechanical strength at failure compared to the coated sample. In some embodiment, the coating was applied to concrete, stainless steel, cables and insulating rubber, followed by exposure to neutron and gamma radiation. Similar results were obtained regarding the protection of the substrate. In some embodiments, the coating was exposed to both acidic and basic solutions to simulate possible corrosive conditions, including for example, acid rain, and/or downhole conditions and the samples did not show evidence of deterioration after about 3 days.

EXAMPLE 12—Rheological Properties of HBN/Cement Composites

Fann Degree Test:

In some embodiments, cement, alkali treated hBN and water were mixed for 5-50 minutes at a speed of 2,000-8,000 rpm in a normal mixer. The rheology experiment was conducted by using a viscometer. Fann degree vs. rpm data show that addition of 0.1 wt % hBN, 1 wt % hBN, 3 wt % hBN, 5 wt % hBN, 10 wt % hBN, 20 wt % hBN, and 40 wt % hBN into the cement slurry impacts the lubricity. As an example, the addition of 5 wt % of hBN into the cement slurry reduced the Fann degrees by at least 20%.

Rheology Test:

In some embodiments, samples were prepared by mixing cement, alkali treated hBN and water in different ratios. In some embodiments, 0.1 wt % hBN, 1 wt % hBN, 3 wt % hBN, 5 wt % hBN, 10 wt % hBN, 20 wt % hBN, and 40 wt % hBN composites were prepared. Then, shear rate was applied from 0 to 250 (1/s). As an example, the shear stress of the sample with 5 wt % of hBN reduced by at least 40% at lower shear rates and at least by 15% at higher shear rates.

Viscosity Measurement:

In some embodiments, viscosity data were estimated at the shear rate of 50 (l/s). In some embodiments, cement slurries with 0.1 wt % hBN, 1 wt % hBN, 3 wt % hBN, 5 wt % hBN, 10 wt % hBN, 20 wt % hBN, and 40 wt % hBN were prepared. As an example, the viscosity of the cement slurry with 5 wt % hBN was reduced by at least 35% compared to cement slurry without hBN. The viscosity of the cement slurry with 1 wt % hBN was reduced by at least 20% compared to cement slurry without hBN. Such embodiments may be advantageous for pumping the slurry in relevant applications such as downhole oil and gas, building construction, road/bridge constructions, etc.

In some embodiments, the disclosed functionalized hBN, composites and/or materials may be used with drilling fluids, drilling muds, oil/water mixes, hydraulic fluids, mineral oil, petroleum oil, synthetic oil, vegetable oil, organic lubricants, biodegradable hydrocarbons, non-biodegradable hydrocarbons, and/or other fluids in order to improve the rheology, thermal conductivity, thermal stability, oxidization resistance, friction, pour point, flash point, viscosity and/or other properties of the fluid. The application of such composite fluids could be useful in engines, hydropower facilities (for example, turbines, generators, transformers, etc.), high voltage power transmission systems, robotics, and biopharmaceuticals as well as for machinery, devices, and/or other application that require lubricants.

Disclosed embodiments relate to a composition comprising cement and hexagonal boron nitride, wherein the hexagonal boron nitride is treated, exfoliated, and/or functionalized. In some embodiments, the composition may further comprise calcium-silicate-hydrate and/or a polymer which may be selected from the group consisting of but not limited to poly(methyl methacrylate), acrylics, polyamides, polyethylenes, polystyrenes, polycarbonates, methacrylics, phenols, polypropylene, polyolefins, polyolefin plastomers, polyolefin elastomers, copolymers of ethylene, epoxy, polyurethane, unsaturated polyester resins, Nitriles, Polyimides, fluorinated polymers, thiol based polymers and combinations thereof. In some embodiments, the composition comprises between about 0.05 wt % and about 15 wt % functionalized hexagonal boron nitride; has a thermal conductivity of at least about 0.1 W/mK, or at least 500 W/mK; the hexagonal boron nitride has a surface area of at least about 1,000 m$^2$/g and/or the hexagonal boron nitride has an aspect ratio of at least about 1,000. In certain embodiments, the functionalized hexagonal boron nitride and cement are mixed in water and then dried to form a composite; the functionalized hexagonal boron nitride and cement are mixed by rotary or shear-mixing; and/or the composition is cured for at least a few hours.

Some disclosed embodiments relate to a method of manufacturing a composite material comprising the steps of: mixing the hexagonal boron nitride with a solvent to create functionalized hexagonal boron nitride; removing solvent from the hexagonal boron nitride solution; mixing the functionalized hexagonal boron nitride with cement. In certain embodiments, the solvent is selected from the group consisting of but not limited to water, isopropyl alcohol, sodium hydroxide, alcohols, dimethylformamide, poly(alkylene glycol), N-Methyl-2-pyrrolidone, Pyridine, surfactant like cetrimonium bromide, Sodium cholate and soap, Ethers, ketones, amines, Nitrated and halogenated hydrocarbons or combinations thereof. Some embodiments may further comprise the steps of sonicating the hexagonal boron nitride solvent solution; adding a liquid to the cement and functionalized hexagonal boron nitride to create a slurry and drying the slurry; centrifuging the hexagonal boron nitride solvent solution resulting in a supernatant; separating the supernatant by decanting and/or centrifuging; drying the supernatant resulting in a sample of chemically exfoliated and functionalized hexagonal boron nitride and/or heating the hexagonal boron nitride. In some embodiments, wherein the mixture contains at least about 0.01 wt % functionalized hexagonal boron nitride; the cement and functionalized hexagonal boron nitride are shear mixed; the cement and functionalized hexagonal boron nitride are mixed in water; and/or the process is substantially free of carcinogenic materials.

The above description is for the purpose of teaching the person of ordinary skill in the art how to practice the present application, and it is not intended to detail all those obvious modifications and variations of it which will become apparent to the skilled worker upon reading the description. It is intended, however, that all such obvious modifications and variations be included within the scope of the present application, which is defined by the following claims. The claims are intended to cover the claimed components and steps in any sequence which is effective to meet the objectives there intended, unless the context specifically indicates the contrary.

What is claimed:
1. A composition comprising cement and hexagonal boron nitride, wherein the hexagonal boron nitride is functionalized and wherein
(a) the hexagonal boron nitride is intercalated or mixed between calcium-silicate-hydrate layers or products of cement hydration; or
(b) the hexagonal boron nitride is less than or about 1 µm in lateral size; or
(c) the composition is in the form of a well casing; or
(d) any combination of (a), (b), or (c).

2. The composition of claim 1, wherein the functionalized hexagonal boron nitride is exfoliated.

3. The composition of claim 1, wherein the composition is substantially free of added graphite or graphite oxide.

4. The composition of claim 1, wherein the hexagonal boron nitride is intercalated between calcium-silicate-hydrate layers or products of cement hydration.

5. The composition of claim 1, wherein the composition includes at least about 1 wt % hexagonal boron nitride and wherein viscosity of the composition is reduced by at least 20% compared to the same composition without hexagonal boron nitride.

6. The composition of claim 1, wherein the hexagonal boron nitride is functionalized such that it increases the compressive strength of the composition at least about 10% over the same material without functionalized hexagonal boron nitride.

7. The composition of claim 1, wherein the composition has a thermal conductivity of at least about 10% greater than the same material without functionalized hexagonal boron nitride.

8. The composition of claim 1, wherein the functionalized hexagonal boron nitride and cement are mixed in water or sodium hydroxide and then dried to form a composite.

9. The composition of claim 1, wherein the functionalized hexagonal boron nitride and cement are mixed by shear-mixing, screw mixing, or rotary mixing.

10. The composition of claim 1, wherein the hexagonal boron nitride is functionalized by heating with sodium hydroxide.

11. The composition of claim 1, wherein the composition has at least about a 30% increase in surface resistivity compared to the same composition without functionalized hexagonal boron nitride as measured with a durability tester.

12. The composition of claim 1, wherein the hexagonal boron nitride is less than or about 1 µm in lateral size.

13. The composition of claim 1, further comprising a polymer selected from the group consisting of poly(methyl methacrylate), acrylics, polyamides, polyethylenes, polystyrenes, polycarbonates, methacrylics, phenols, polypropylene, polyolefins, polyolefin plastomers, polyolefin elastomers, copolymers of ethylene, epoxy, polyurethane, unsaturated polyester resins and combinations thereof.

14. The composition of claim 1, wherein the composite substantially maintains hardness after radiation exposure.

15. The composition of claim 1, wherein the composition is in the form of a coating.

16. The composition of claim 1, wherein the composition is in the form of a well casing.

17. A method of manufacturing a composite material comprising the steps of:
mixing hexagonal boron nitride with a solvent to create functionalized hexagonal boron nitride;
removing solvent from the hexagonal boron nitride solution; and
mixing the functionalized hexagonal boron nitride with cement
wherein (a) the hexagonal boron nitride is intercalated or mixed between calcium-silicate-hydrate layers or products of cement hydration; or
(b) the hexagonal boron nitride is less than or about 1 µm in lateral size; or
(c) the composition is in the form of a well casing; or
(d) any combination of (a), (b), or (c).

18. The method of claim 17, wherein the solvent is selected from the group consisting of water, isopropyl alcohol, sodium hydroxide, tert-butanol, 1- and 2-butanol, 1- and 2-propanol, ethanol, methanol, acetone, dimethylformamide, sodium cholate, poly(ethylene glycol), N-methyl-2-pyrrolidone, pyridine, cetrimonium bromide, sodium cholate, soap, ethers, ketones, amines, nitrated hydrocarbons, halogenated hydrocarbons and combinations thereof.

19. The method of claim 17, further comprising the steps of, prior to mixing the functionalized hexagonal boron nitride with cement, centrifuging the hexagonal boron nitride solvent solution resulting in a supernatant;
separating the supernatant; and
drying the supernatant resulting in a sample of chemically exfoliated and functionalized hexagonal boron nitride.

20. A composition comprising cement and a treated hexagonal boron nitride, wherein the composition comprises up to about 15 wt % hexagonal boron nitride and wherein the compressive strength of the composition is increased by at least 10% over the cement composition without hexagonal boron nitride and wherein
(a) the treated hexagonal boron nitride is intercalated or mixed between calcium-silicate-hydrate layers or products of cement hydration; or
(b) the treated hexagonal boron nitride is less than or about 1 µm in lateral size; or
(c) the composition is in the form of a well casing; or
(d) any combination of (a), (b), or (c).

* * * * *